(12) United States Patent
Cardella et al.

(10) Patent No.: US 6,480,810 B1
(45) Date of Patent: Nov. 12, 2002

(54) PROCESS FOR THE MONITORING AND DIAGNOSTICS OF DATA FROM A REMOTE ASSET

(75) Inventors: Aidan Thomas Cardella, Schenectady, NY (US); Evelyn Varner, Cottekill, NY (US)

(73) Assignee: General Electric Corporation, Schenectady, NY (US)

( * ) Notice: Subject to any disclaimer, the term of this patent is extended or adjusted under 35 U.S.C. 154(b) by 92 days.

(21) Appl. No.: 09/702,182

(22) Filed: Oct. 30, 2000

Related U.S. Application Data

(60) Provisional application No. 60/162,048, filed on Oct. 28, 1999.

(51) Int. Cl.⁷ ................................................. G06F 3/00
(52) U.S. Cl. ........................ 702/188; 702/182; 702/183; 702/186
(58) Field of Search ................................ 702/188, 183, 702/182, 186; 340/539

(56) References Cited

U.S. PATENT DOCUMENTS

| | | | |
|---|---|---|---|
| 5,566,092 A | | 10/1996 | Wang et al. |
| 5,781,871 A | | 7/1998 | Mezger et al. |
| 6,014,612 A | * | 1/2000 | Larson et al. ............... 702/183 |
| 6,088,665 A | * | 7/2000 | Burns et al. ................ 702/188 |
| 6,262,659 B1 | * | 7/2001 | Korkosz et al. ............ 340/539 |

FOREIGN PATENT DOCUMENTS

| | | |
|---|---|---|
| EP | 0 843 244 A | 5/1998 |
| WO | WO9945517 A | 9/1999 |

* cited by examiner

*Primary Examiner*—Marc S. Hoff
*Assistant Examiner*—Felix Suarez
(74) *Attorney, Agent, or Firm*—Terry M. Sanks, Esq.; Beusse Brownlee Bowdoin & Wolter, P.A.

(57) ABSTRACT

A method for processing monitored data from a remote asset to optimize maintenance and operation schedules, the method comprising the steps of collecting data from the remote asset, building a data set based on the data collected, applying statistical scripts to the data set to create a statistical model, comparing the statistical model to the data set, creating a standardization model from the compared statistical model and the data set, applying a trending algorithm to the data, deriving statistical based control limits, and applying the control limits to a new set of collected data.

23 Claims, 2 Drawing Sheets

PROCESS FOR THE MONITORING AND DIAGNOSTICS OF DATA FROM A REMOTE ASSET

The present invention claims the benefit of U.S. Provisional application Ser. No. 60/162,048 filed Oct. 28, 1999.

BACKGROUND OF THE INVENTION

This invention relates to diagnostics and monitoring systems, and more particularly to a method and system for processing incoming monitored data from a remote asset, such as a locomotive, where the system automatically, or with limited user interface, evaluates and determines whether the monitored data is within predetermined operating thresholds.

A locomotive is a complex system comprised of many subsystems. Many of the subsystems need fluids, such as oil, coolant, fuel, and other lubricating fluids for operation. If any of these fluids become contaminated or the fluid levels drop below acceptable operational limits, any one of these fluids may result in engine failure during operation or may reduce the reliability of the engine not failing before its next scheduled maintenance. Having less than adequate fluid could result in components running hot or operating in a mode that is not considered optimum for the given component.

Systems exist which are capable of measuring the quality and level of an engine's various fluids. For example, it is believed that U.S. Pat. No. 5,964,318 discloses a system for measuring the quality and level of lubricants in an engine, specifically in an lubricant reservoir, wherein new lubricant is injected as needed. The state of the lubricant is then communicated to a remote site through a data link.

However even if a system can detect that a lubricant level is low and replace the missing lubricant, it does not appear to determine how the less than optimum fluid level has effected the engine, nor has it determined whether the lubricant has been contaminated.

SUMMARY OF THE INVENTION

Towards this end, there is a particular need to a method or process to automatically, or with limited user interface, detect anomalous conditions of a remote asset. This method or process can be achieved with a series of algorithms to build a data set based on historical data and then apply statistical scripts to the data set to perform several iterations of statistical analysis on the data collected from a remote asset which are eventually applied to current data collected. The process enables a more accurate and precise monitoring and diagnosis of a remote asset's anomalous condition via a reduction in the false alarm rate associated with the input thresholds or limits. This is accomplished by a reduction in the variability of the input signal via application of a standardization algorithm and optimum choice of trending parameters.

The method comprises collecting data from the remote asset, building a data set based on the data collected, applying statistical scripts to the data set to create a statistical model, comparing the statistical model to the data set, and creating a standardization model from the compared statistical model and the data set, applying a trending algorithm to the data, deriving statistical based control limits, and applying the control limits to a new set of data.

DETAILED DESCRIPTION OF THE INVENTION

Figure 1:
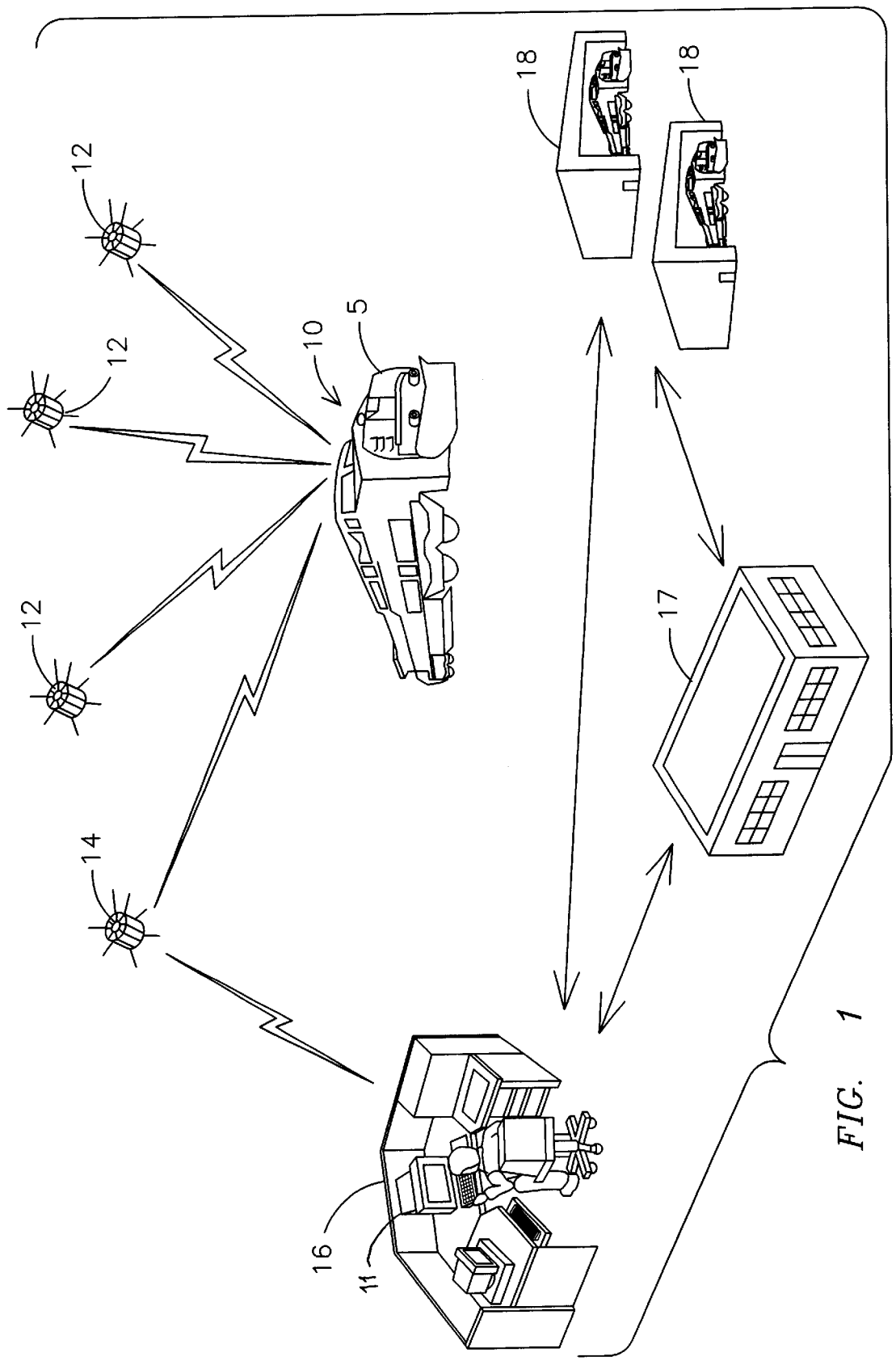
FIG. 1 is an exemplary example of components used for a remote diagnostics and monitoring system of a remote asset.
Figure 2:
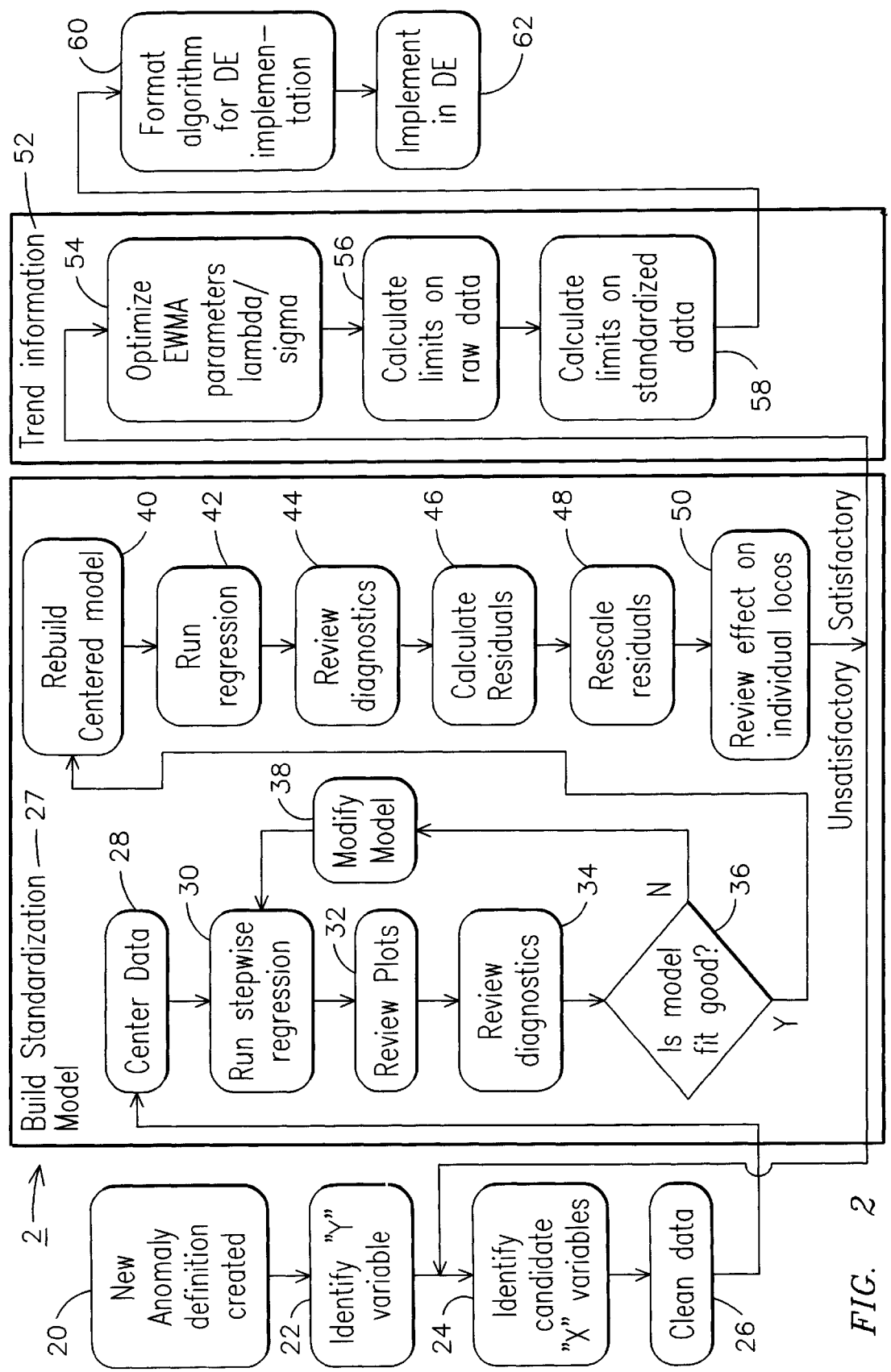
FIG. 2 illustrates the steps taken in processing incoming monitored parameter data to aid in monitoring and diagnosis of a remote asset.

FIG. 1 is an exemplary example of components used for a remote diagnostics and monitoring system of a remote asset. The remote asset, or locomotive, 5 has an on-board monitor system 10 to monitor such items as fluid temperatures, fluid levels, component temperatures, and current levels and voltage outputs. The system can also monitor the location of the locomotive via a global positioning system 12. Once the monitored data is collected, it is sent, via either a satellite link 14, or a direct line connection, not shown, to a monitoring and diagnostic service center 16 which includes a respective transceiver, not shown, at each location. In another embodiment, the monitoring and diagnostic service center 16 uses a processor 11 to process 2, as shown in FIG. 2, the data. In one embodiment, the monitoring and diagnostic service center 16 has the ability to communicate either the collected data or processed results to a customer facility 17 as well as repair depots 18. Communication of the data or results is also possible between the customer facility 17 and repair depots 18. Communication with and between the customer facility 17 and the repair depots 18 can be by either a direct line connection or by a satellite link where each location has a respective transceiver.

FIG. 2 illustrates the overall process 2 which comprises the steps, algorithms or sub-processes, taken in processing incoming monitored parameter data to aid in monitoring and diagnosis of a remote asset. In one embodiment, the steps of FIG. 2 are implemented and executed by a central processing unit located at the monitoring and diagnostic service center 16, shown in FIG. 1. The steps delineate a process 2 by which a series of algorithms, or sub-processes, 20, 22, 24, 26 are used to build a data set and then utilize an array of statistical scripts 28, 30, 32, 34, 36, 40, 42, 44, 46, 48, 50 to perform several iterations of statistical analysis on the incoming monitored parameter data 27. The preliminary output of the process is a statistical model which is applied to the monitored parameter data in order to eliminate the effects of extraneous variables and obtain a standardized signal.

Trending 52 the resulting standardized signal next occurs. In trending, control chart type limits, boundaries, are placed around the data to indicate whether the data are within predetermined control limits. The control chart type limits are derived from the data using a time series modeling optimization technique, such as an Exponentially Weighted Moving Average (EWMA) technique 54. In one embodiment, an Auto-Regressive Integrated Moving Average (ARIMA) technique is used to optimize a value used in calculating the EWMA chart. With the EWMA chart, limits on the data and subsequent standardized data are determined 56, 58. The resultant standardization model and data thresholds are then formatted recorded 60 for subsequent implementation 62 in a completely automated monitoring and diagnostic system where newly collected data is compared to the resultant standardization model and data thresholds to determine anomalous readings from the data. As illustrated in FIG. 1, these results can then be communicated to a customer facility 17 as well as repair depots 18.

The process in FIG. 2 enables creating a new anomaly definition, step 20. Creating a new anomaly definition is simply creating a rule established for detecting specific anomalous conditions that may be indicative of a forthcoming problem with a remote asset. Once done, Step 22 is to identify a variable, "Y". An example of a Y variable include, but is not limited to, lube oil temperature and manifold air pressure. The Y variable may be a monitored parameter or some quantity derived from one or more monitored parameters as specified in the anomaly definition. Step 24 is to identify candidate "X" variables. Candidate X variables are those factors, monitored parameters or quantities derived from monitored parameters, that are believed to partially explain the variability observed in the Y variable. Examples of X variables include, but is not limited to engine coolant temperature, engine speed, ambient temperature and barometric pressure. Choice of candidate X variables can be experienced-based, engineering knowledge-based, or data-based. Step 26 involves "cleaning" the data. In this step, unacceptable or invalid data are removed from further evaluation. For example, if the information collected is outside a range of what has been determined as acceptable data as specified in the anomaly definition, this data is deleted during this step. Though not a conclusive list, such bad data may include instances when a locomotive's gross horse power is less then 5800; when engine speed is less than 1045 revolutions per minute (RPM); or when missing values are detected.

After the data is cleansed, a standardization model is built 27. The first step 28 is to center the data. In this statistical script, the "X" variables are centered at 0 by subtracting the mean of each variable from individual observations. Specifically, if $X=(x_1,x_2, x_3. . . x_n)$ and then, centered $X=(x_1\text{-xbar}, x_2\text{-xbar}, \ldots x_n\text{-xbar})$. The next step, 30 is to run a regression algorithm, or technique, such a stepwise $$Xbar = \frac{\sum_{i=1}^{n} X_i}{n}$$

egression algorithm on the data set. An appropriate computer package, such as SAS or S Plus, can be used to run this step. Using such an algorithm will determine a degree of linear association between the data collected from the remote asset and the parameters included in the new anomaly definition. Running a regression algorithm will also assist in determining what may be causing a anomalous reading. For example, if the lubrication temperature is running high, the process must determine whether it is running high because of ambient temperature or barometric pressure. The stepwise regression algorithm allows the process to compensate the data for effects that are caused by environmental parameters.

The process next reviews information that is collected. Specifically data plots, step 32, are reviewed and evaluated. Plots of raw data (e.g. Y variable vs. time, $x_i$ vs. time, and cross correlation plots) for unusual observations, relationships amongst the X variables and indications of additional potential X variables are examined. The diagnostics data, step 34, is next reviewed. For example, the diagnostic data plots and metrics are reviewed. Once the data is reviewed, a decision gate, step 36, is reached. Here the process makes an assessment of whether the data, or model, fits established parameters. This assessment is made from the information gatherer form the raw data plots, diagnostic plots and diagnostic numerical outputs to evaluate the adequacy of the model. If the model is not acceptable, the system modifies the model, step 38, by returning to step 30 to rerun the stepwise regression and then proceeding through steps 32, 34, 36 again.

If the model is acceptable, the next step is to rebuild a centered model, step 40. This is done by un-centering the X variables where the mean for each variable is added back to individual observations. The next step is to run a regression algorithm on rebuilt un-centered data, step 42. At this phase of the process, diagnostics are again reviewed, step 44, by examining plots of raw data (e.g. Y variable vs. time, $x_i$ vs. time, and cross correlation plots) for unusual observations, relationships amongst the X variables and indications of additional potential x variables and metrics data. Within this step, the system will again assess whether the model fits predetermined parameters given the appearance of raw data plots, diagnostic plots and diagnostic numerical outputs.

Next, the system will calculate residuals at step 46 where a residual is calculated as $$\text{Residual} = \text{Actual } Y - \text{Predicted } Y,$$

or in other words, the difference of information remaining from the actual Y variable when compared to the predicted Y variable. The process will then re-scale the residuals, or build a standardized variable at step 48. The standardized variable is known as the residual plus target. A standardized Y variable value is calculated by adding the residual to the target value to calculate a standardized Y variable value. The target value is the mean of the Y variable as calculated in steady state.

The system will then review the effect of standardization on individual locomotives at step 50. Here, the system will assess variability decreases due to standardization by the locomotive by examining box plots, which are graphical representations of the data, and values of standard deviation of individual locomotives before and after standardization. If the results do not meet a set of predetermined factors, the system will return to step 24 to re-identify candidate X variables. However, if the results do meet a set of predetermined factors, the system will begin to trend the information 52. In the Trend Information 52 segment of the process 2, the first step, 54, is to optimize parameters lambda/sigma in an Exponentially Weighted Moving Average (EWMA) chart. An Auto-Regressive Integrated Moving Average technique (ARIMA) is used to calculate a value, lambda. ARIMA is a family of time series forecasting models that rely on a tendency of the next item in some series to relate not just to prior values (auto-regressive), but to a moving average of prior values.

An EWMA chart is a control chart for variables data (data that is both quantitative and continuous in measurement, such as a measured dimension or time). It plots weighted moving average values. A weighting factor is chosen by the user to determine how older data points affect the mean value compared to more recent ones. Because a EWMA chart uses information from all samples, it detects much smaller process shifts than a normal control chart would.

This includes determining tolerable false alarm rate; determining the size of shift EWMA should detect; and optimizing the value of a trend smoothing constant, (weight=$\lambda$), and width of control limits, in k sigmas, where k specifies the width of the control charts limits as a multiple of the standard errors of the plotted EWMAs, given the above mentioned information. EWMA is used to create an exponentially weighted moving average (EWMA) control chart, which is used to determine whether a process is in a state of statistical control and to detect shifts in the process average. Each point on the chart indicates the value of the EWMA for a measured subgroup. For example, the EWMA for a given subgroup (Ei) is defined recursively as $$Ei = \text{Lambda}(Xbar) + (1-\text{Lambda})Ei-1$$

Where Xbar represents current observation and i>0. Within step 56 the EWMA limits on data, or information, are calculated and then limits on standardized data, or information, are calculated, step 58.

Once the limits for the standardized data are calculated, step 58, the next step, 60, is to format an algorithm to facilitate implementation via a diagnostic compute engine (DE), such as the General Electric Transportation System Remote Monitoring and Diagnostics Service Center Diagnostic Engine (DE). This is the compute engine which takes in the anomaly definitions generated by the process described above and applies them to incoming observations. Now, the process is implemented in DE, step 62. Supervised verification and validation of the algorithm is performed by passing or using an external field data test set with a known output value in order to assess performance and validate the methodology employed.

While the invention has been described in what is presently considered to be the preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A method for processing monitored data from a remote asset to optimize maintenance and operation schedules, the method comprising:
   collecting data from the remote asset;
   building a data set based on the data collected;
   applying statistical scripts to the data set to create a statistical model;
   comparing the statistical model to the data set;
   creating a standardization model from the compared statistical model and the data set;
   applying a trending algorithm to the data;
   deriving statistical based control limits;
   applying the control limits to a new set of collected data;
   trending information using a time series modeling optimization technique for determining the remote asset's maintenance and operation schedules;
   developing optimized maintenance and operation schedules based on the trended information;
   reporting the schedules to a user.

2. The method of claim 1 wherein the building a data set further comprises using a series of algorithms to build the data set.

3. The method of claim 2 wherein using a series of algorithms further comprises:
   creating an anomaly definition; and
   identifying variables to monitor.

4. The method of claim 1 wherein the applying statistical scripts further comprises:
   using a statistical script for centering the data at a predetermined variable;
   using a statistical script for running a stepwise regression script on the centered data;
   using a statistical script for un-centering the data.

5. The method of claim 1 further comprising eliminating extraneous variables discovered during comparing the statistical model to the data set.

6. The method of claim 1 wherein applying a trending algorithm to the data further comprises determining control chart type limits.

7. The method of claim 6 wherein determining control chart type limits comprises applying a time series modeling optimization technique to determine control chart type limits.

8. The method of claim 1 wherein applying the control limits to a new set of data further comprising the steps of:
   recording the standardization model and data thresholds for implementation in an automated monitoring and diagnostic system; and
   determining a remote asset's maintenance and operation schedule.

9. The method of claim 8 further comprising the step of notifying a user of results after determining a remote asset's maintenance and operation schedule.

10. A system for processing monitored data from a remote asset to evaluate and determine a status of the remote asset with minimum user interface, the system comprising:
    a remote asset;
    a data gathering module located at the remote asset to collect data about the remote asset;
    a monitoring and diagnostic service center;
    respective network interfaces located at the remote asset and the monitoring and diagnostic service center;
    a processor to manage sending, evaluating, and receiving the data;
    a process residing in the processor which uses algorithms to build a data set based on the data gathered uses statistical scripts on the data to determine a statistical model, and uses a time series modeling optimization technique to trend information to determine the remote asset's maintenance and operation schedules.

11. The system of claim 10 wherein the remote asset transmits data collected by the data collection module to the process located at the monitoring and diagnostic service center.

12. The system of claim 10 further comprising:
    a customer facility;
    a repair depot;
    respective network interfaces located at said customer facility and repair depot;
    wherein the remote asset's maintenance and operation schedules determined by the process are communicated from the monitoring and diagnostic service center to the customer facility and repair depot.

13. The system of claim 10 wherein the process comprises a sub-process to compare the statistical model to the collected data.

14. The system of claim 10 wherein the time series modeling optimization technique used in the process is an Exponentially Weighted Moving Average technique.

15. The system of claim 14 wherein an Auto-Regressive Integrated Moving Average technique is used to calculate a value in the Exponentially Weighted Moving Average technique.

16. The system of claim 10 wherein the processor further comprises a diagnostic compute engine to determine whether the data is within a specified operating range as determined by the process.

17. The system of claim 10 wherein the results determined by the process are communicated to a user.

18. A method for processing monitored data from a remote asset to determine whether the data is within a predetermined operating threshold, the method comprising:
    collecting monitored data from the remote asset;
    providing a processor;

supplying the monitored data to the processor;creating an anomaly definition which comprises acceptable parameters;

identifying a first variable;

identifying a second set of variables which are used to monitor the first variable;

deleting data that is outside of a specified parameter;

centering data about a specified variable;

running a stepwise regression algorithm;

determining whether data is within acceptable parameters;

un-centering data if data are within acceptable parameters;

running the stepwise regression algorithm on the un-centered data;

calculating residuals based on a calculated first variable compared to a predicted first variable;

building a standardized variable based on calculated residuals;

assessing data before and after standardization to determine whether results are within a predetermined limit;

trending the data to determine whether the assessed data is within the predetermined operating threshold;

developing optimized maintenance and operation schedules based on the trended data;

reporting the schedules to a user.

19. The method of claim 18 wherein trending the data further comprises optimizing an Exponentially Weighted Moving Average technique and applying the optimized Exponentially Weighted Moving Average technique to the standardized variable and the monitored data.

20. The method of claim 18 wherein reporting results to a user further comprises formatting an algorithm to facilitate implementation with a diagnostic compute engine and implementing the diagnostic compute engine.

21. The method of claim 18 further comprising determining whether the data is within acceptable parameters.

22. The method of claim 21 further comprising re-running the first stepwise regression if the data is not within acceptable parameters.

23. The method of claim 18 further comprising identifying a new second set of variables which are used to monitor the first variable and continuing through a build standardization model when assessed data is not within an acceptable limit.

* * * * *